(12) United States Patent
Kerns et al.

(10) Patent No.: US 9,448,619 B1
(45) Date of Patent: Sep. 20, 2016

(54) VIDEO ADVERTISEMENT OVERLAY SYSTEM AND METHOD

(75) Inventors: Jamieson Kerns, Santa Monica, CA (US); Mary Moon, Houston, TX (US); Shiva Jaini, Mountain View, CA (US); Nicola Ann Crane, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/465,850

(22) Filed: May 7, 2012

Related U.S. Application Data

(60) Provisional application No. 61/565,229, filed on Nov. 30, 2011.

(51) Int. Cl.
*G06F 3/00* (2006.01)
*G06F 13/00* (2006.01)
*H04N 5/445* (2011.01)

(52) U.S. Cl.
CPC ............. *G06F 3/00* (2013.01); *G06F 13/00* (2013.01)

(58) Field of Classification Search
CPC ............. H04N 21/812; H04N 21/23439; H04N 21/454
USPC ........................................... 725/37–61
See application file for complete search history.

(56) References Cited

U.S. PATENT DOCUMENTS

| | | | | |
|---|---|---|---|---|
| 7,120,690 | B1 * | 10/2006 | Krishnan | G06F 17/30575 707/999.2 |
| 8,942,536 | B2 * | 1/2015 | Herz | H04N 5/85 386/219 |
| 2002/0138831 | A1 * | 9/2002 | Wachtfogel et al. | 725/32 |
| 2002/0191950 | A1 * | 12/2002 | Wang | H04N 5/783 386/218 |
| 2004/0034874 | A1 * | 2/2004 | Hord et al. | 725/136 |
| 2004/0133909 | A1 * | 7/2004 | Ma | 725/34 |
| 2005/0235318 | A1 * | 10/2005 | Grauch et al. | 725/46 |
| 2005/0235331 | A1 * | 10/2005 | Lynch | H04N 5/4403 725/100 |
| 2007/0003220 | A1 * | 1/2007 | Hamasaka | G11B 20/10 386/219 |
| 2007/0239546 | A1 * | 10/2007 | Blum | G06Q 30/02 705/14.47 |
| 2007/0300263 | A1 * | 12/2007 | Barton et al. | 725/60 |
| 2008/0046584 | A1 * | 2/2008 | Tucker | H04N 7/163 709/231 |
| 2008/0046919 | A1 * | 2/2008 | Carmi et al. | 725/32 |
| 2008/0109844 | A1 * | 5/2008 | Baldeschwieler et al. | 725/35 |
| 2008/0115161 | A1 * | 5/2008 | Kurzion | 725/32 |
| 2008/0276269 | A1 * | 11/2008 | Miller et al. | 725/34 |
| 2009/0178089 | A1 * | 7/2009 | Picco et al. | 725/87 |
| 2009/0183198 | A1 * | 7/2009 | Ehlers | H04H 20/106 725/32 |
| 2009/0210904 | A1 * | 8/2009 | Baron et al. | 725/39 |
| 2009/0300670 | A1 * | 12/2009 | Barish | 725/13 |
| 2010/0023966 | A1 * | 1/2010 | Shahraray et al. | 725/34 |
| 2010/0061709 | A1 * | 3/2010 | Agnihotri et al. | 386/124 |
| 2010/0162313 | A1 * | 6/2010 | Ruiz-Velasco et al. | 725/44 |
| 2010/0269131 | A1 * | 10/2010 | Newberry et al. | 725/32 |
| 2010/0290761 | A1 * | 11/2010 | Drake et al. | 386/350 |
| 2011/0072463 | A1 * | 3/2011 | Zaslavsky et al. | 725/41 |
| 2011/0078001 | A1 * | 3/2011 | Archer et al. | 705/14.2 |
| 2011/0167456 | A1 * | 7/2011 | Kokenos et al. | 725/60 |
| 2011/0173655 | A1 * | 7/2011 | Blumenschein et al. | 725/35 |
| 2011/0243533 | A1 * | 10/2011 | Stern et al. | 386/278 |
| 2012/0054787 | A1 * | 3/2012 | Reichardt et al. | 725/25 |
| 2012/0110615 | A1 * | 5/2012 | Kilar | G06Q 30/02 725/32 |
| 2012/0240142 | A1 * | 9/2012 | Rose | 725/14 |
| 2013/0091299 | A1 * | 4/2013 | Wei et al. | 709/231 |
| 2014/0109140 | A1 * | 4/2014 | Yao et al. | 725/41 |

* cited by examiner

*Primary Examiner* — Mushfikh Alam
(74) *Attorney, Agent, or Firm* — Byrne Poh LLP

(57) ABSTRACT

This disclosure relates system(s) and method(s) for overlaying functionalities, text, annotations, and/or features on video advertisements and content videos.

37 Claims, 11 Drawing Sheets

VIDEO ADVERTISEMENT OVERLAY SYSTEM AND METHOD

CROSS-REFERENCE TO RELATED APPLICATION

This application claims priority to U.S. Provisional Patent Application No. 61/565,229, filed on Nov. 30, 2011, and entitled "VIDEO ADVERTISEMENT OVERLAY SYSTEM AND METHOD". The entirety of the above referenced provisional application is incorporated herein by reference.

TECHNICAL FIELD

This disclosure relates system(s) and method(s) for overlaying functionalities, text, annotations, and/or features on video advertisements and content videos.

BACKGROUND

Conventionally, after users are presented with an in-stream video ad, it's difficult for them to recall that video ad to watch it afterwards or interact with it. Moreover, given the option users often skip an in-stream video ad they are interested in watching in order to first watch a content video. Unfortunately, there is no easy manner to locate the skipped video ad and watch it later. Consequently, an advertiser of the skipped video ad is missing out on potential views for an interested audience. Likewise, a host site for the advertisement may also lose revenue if the video advertisement is paid for on a charge per view basis.

SUMMARY

A simplified summary is provided herein to help enable a basic or general understanding of various aspects of exemplary non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a presentation component presents a content video or a video advertisement for user viewing, and an overlay component generates an overlay having a set of features related to the video advertisement, wherein the set of features enhance user interaction with the video advertisement. The presentation component presents the overlay with the content video or video advertisement.

In accordance with another non-limiting implementation, a content video or a video advertisement is presented for user viewing, an overlay is generated having a set of features related to the video advertisement, wherein the set of features enhance user interaction with the video advertisement, and the overlay is presented with the content video or video advertisement.

These and other implementations and embodiments are described in more detail below.

DETAILED DESCRIPTION

Overview

Figure 1:
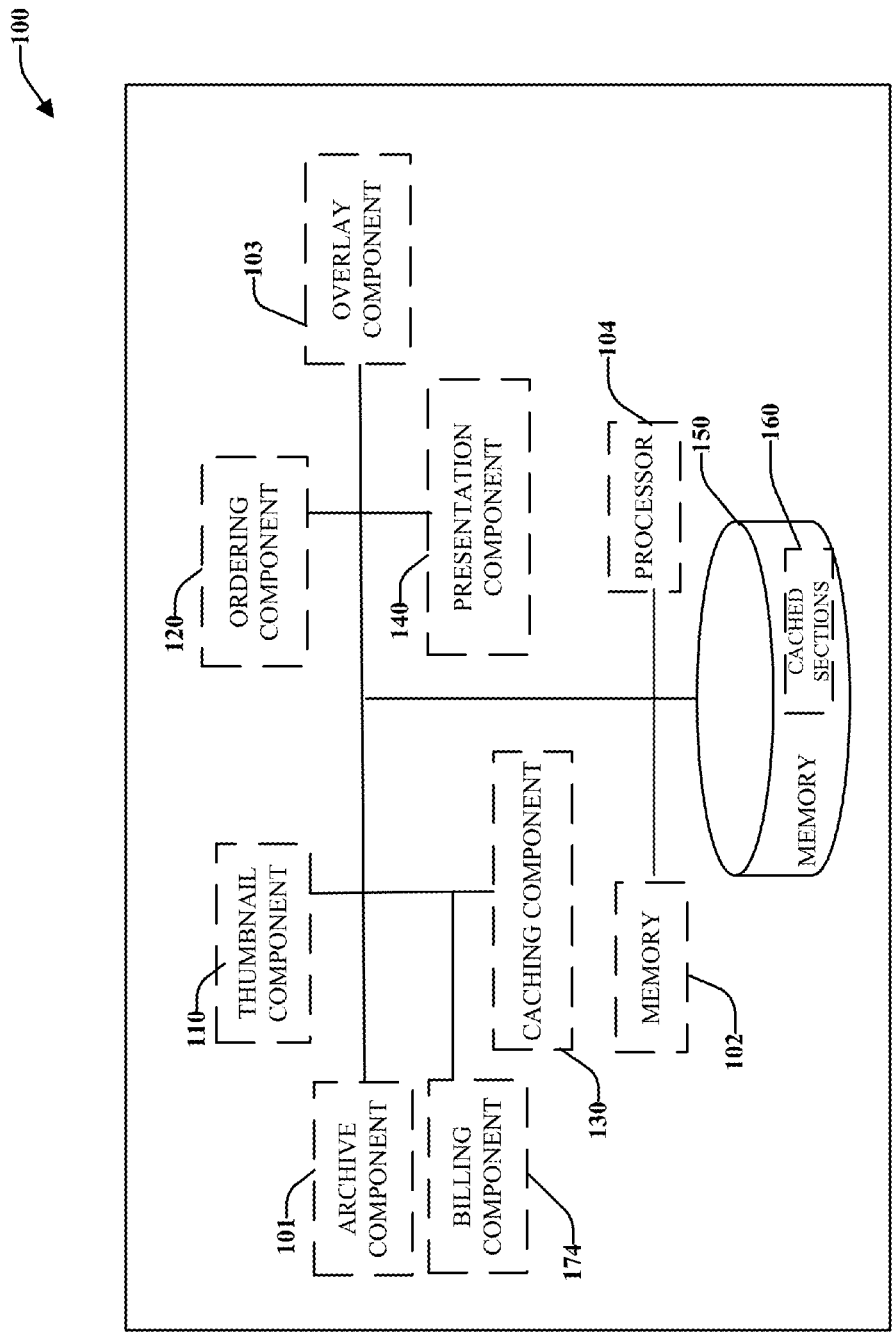
FIG. 1 illustrates a block diagram of an exemplary non-limiting system for providing video advertisement overlays in conjunction with video advertisements or content videos in accordance with an implementation of this disclosure.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

By way of introduction, the subject matter described in this disclosure relates to presentation of video advertisements (e.g., promoted videos, video ads), archiving the video advertisements, and postponing billing thereof through use of an overlay to the advertisement that exposes a variety of features that enhance user interaction with the advertisement.

Conventionally, after users are presented with an in-stream video ad, it's difficult for them to recall that video ad to watch it afterwards or interact with it. Moreover, given the option users often skip an in-stream video ad they are interested in watching in order to first watch a content video. Unfortunately, there is no easy manner to locate the skipped video ad and watch it later. Consequently, an advertiser of the skipped video ad is missing out on potential views for an interested audience. Likewise, a host site for the advertisement may also lose revenue if the video advertisement is paid for on a charge per view basis.

Employment of the advertisement overlay can increase click through rate (CTR) and revenue of video ads by enabling user interaction with the video advertisement during and after the video ad plays via the connected overlay containing information related to an in-stream video ad (and any other interactive abilities relating to the video ad). The overlay can appear over the content video, or during or after the in-stream ad is played, and the user can optionally mask or unmask the overlay or interact with overlay components/features. The overlay can include for example: the video ad title; a video ad thumbnail (optional); a link that directs to a page where that video ad can be viewed in full; a click-through link to a specified landing page associated with the video ad; attribution text indicating the overlay refers to a video advertisement; text that "user just watched . . . " or "watch later" to identify the video ad; playlist of archived content videos or video ads; advertisement rating feature; counters for playback time left in video ad or time remaining until video ad can be skipped; reminders to view archived video ads, or ability to mask/unmask the overlay at any time during playback of the content video.

In accordance with an embodiment, a system provides an archiving component that allows for storing, indexing, or bookmarking skipped video ads so that they can be easily located and viewed by a user at a later point in time. For example, instead of or in addition to a skip button for skippable in-stream ads, the system can display an option to add the video advertisement to a watch later playlist so that the user can access the skipped video ad at a later point in time. The watch later feature can optionally be configured to also display the skipped ad again at the end of video content to which the user skipped as a post-roll. If the user later watched the video as a post-roll or as part of the watch later playlist, then this action could optionally be tracked. If the user met a threshold for the amount of viewing time of the video ad needed to qualify as a view, then the advertisement view can be treated as a billable event regardless of whether the advertisement was watched when first presented or afterwards. Furthermore, skipped video ads, the watch later playlist, or skipped video ad overlays can be presented to a user automatically, for example, based upon an inference that the user is available to view video ads.

Example Displaying Overlay with Video Advertisement or Content Video

Referring now to the drawings, with reference initially to FIG. 1, an advertising delivery system 100 is shown that facilitates providing advertising content in conjunction with archiving video advertisements for later viewing. Moreover, overlays can be generated that are associated with an in-stream video advertisement to provide features that enhance user interaction with the advertisement as well as user management of the video advertisement. Aspects of the systems, apparatuses or processes explained in this disclosure can constitute machine-executable component(s) embodied within machine(s), e.g., embodied in one or more computer readable mediums (or media) associated with one or more machines, non-limiting examples of which are illustrated in relation to FIGS. 10 and 11. Such component, when executed by the one or more machines, e.g., computer(s), computing device(s), virtual machine(s), etc. can cause the machine(s) to perform the operations described. Advertising delivery system 100 can include memory 102 for storing computer executable components and instructions. A processor 104 can facilitate operation of the computer executable components and instructions by advertising delivery system 100.

In an embodiment, advertising delivery system 100 employs an archiving component 101, an overlay component 103, a thumbnail component 110, an ordering component 120, a caching component 130, a presentation component 140, and a billing component 174. In an aspect, overlay component 103 can generate an overlay that exposes features and functionalities of the below-noted components. Thumbnail component 110 can generate one or more thumbnail views of media content. In a non-limiting example, media content can include skipped or watched video advertisements, or content video(s) that are intended for playing after a video advertisement, or any other digital media. Ordering component 120 orders (ranks) respective media content to be displayed after respective advertisement(s) are viewed or skipped. The ordering of the thumbnails (which can correspond to the ordering of corresponding media content to be displayed) can for example be a function of determined or inferred user interest, user context, relevance to user, advertiser preference, host site preference. Caching component 130 can cache respective video ads, content videos, and associated thumbnails as a function of the ranking (e.g., to improve streaming speed, bandwidth utilization, buffering, or resource allocation), and presentation component 140 transmits or presents respective video ads, thumbnails of video ads, thumbnails of the content to be viewed as well as the content video(s). Presentation component 140 and/or overlay component 103 can present additional functions and content in connection with video advertisements and content videos (e.g., headline for the video advertisement, title of video advertisement, link to the video advertisements' watch page, a user voting or ranking feature (e.g., +1, like, dislike . . . ), learn more feature, countdown for time left in the video advertisement, countdown of time left before the video advertisement can be skipped . . . ). Additionally, advertising delivery system 100 includes a memory 150 that can store video ads, content videos, and content thumbnails, as well as, data generated by archiving component 101, overlay component 103, thumbnail component 110, ordering component 120, caching component 130, presentation component 140, and billing component 174. Memory 150 can be stored on any suitable type of storage device, non-limiting examples of which are illustrated with reference to FIGS. 10 and 11.

The video ads, the content videos, or associated thumbnails can include data associated with one or more data sources (not shown) that can be accessed by a client device (not shown) or by a content delivery system such as advertising delivery system 100 (and additional systems described in this disclosure). For example, a data source can include a data store storing media content and affiliated with a content provider that interacts with advertising delivery system 100. In another aspect, a data source can include a data store that stores media content remote from a content provider or an advertising delivery system 100.

A client device can include any suitable computing device associated with a user and configured to interact with or receive media content. For example, a client device can include a mobile device, a mobile phone, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, audio/video receiver, radio device, portable music player, navigation system, car stereo, etc. Moreover, a client device can include a user interface (e.g., a web browser or application), that can receive and present displays and generated locally or remotely. It is to be appreciated that advertising delivery system 100 can be remote from the client device or can be included within the client device. As used in this disclosure, the terms "content consumer" or "user" refer to a person, entity, system, or combination thereof that employ advertising delivery system 100 (or additional systems described in this disclosure). In an aspect, a client device or advertising delivery system 100 (or additional systems described in this disclosure) can be configured to access media content via a wired or wireless network, such as for example the Internet, intranet, or cellular service.

Thumbnail component 110 generates thumbnails of content videos or video advertisements. In a non-limiting example, thumbnail component 110 can extract a thumbnail from metadata associated with a content video or video advertisement, for example a thumbnail that is supplied by the publisher of the content video or video advertisement. In another non-limiting example, thumbnail component 110 can analyze the content of a content video or video advertisement and select a video frame from the content video or video advertisement that is representative of the content video or video advertisement as the thumbnail. In a further example, thumbnail component 110 can analyze the content of a content video or video advertisement and select a plurality of frames representative of the content video or video advertisement to form a collage as the thumbnail. Furthermore, thumbnail component 110 can take into account information associated with a user that will view the content after or video advertisement to generate a thumbnail relevant to that user. For example, user preferences such as stored in a user profile or inferred by monitoring past user interactions with content videos, video advertisement, or other media content can be employed to determine user interest in order to generate a thumbnail that is relevant to the user.

In a non-limiting example, thumbnail component 110 can generate thumbnails as a function of inferred or determined user interest, for example, based on user preferences, historical views, user context, user location, user queries, etc. In a non-limiting example, thumbnail component 110 can determine thumbnails that are likely to be of interest to a user, for example using artificial intelligence, by examining logs storing user interaction with content, non-limiting examples or which include, user context, searches, navigation of a content, viewing content, social networking, browsing content, rating content, ranking content, purchasing content, like indication of content, dislike indication of content, and/or comments or annotations applied to content. In another example, user preferences stored in a user profile and/or inferred by monitoring user interaction with the client device can be employed to determine thumbnails of interest to a user. In a further example, user profiles for a user and/or friends of a user can provide shared preference settings or inferences of thumbnails that are of interest to groups of users. It is to be appreciated that any criteria can be employed for determining which thumbnails may be of interest to a user. Thumbnail component 110 can generate and associate a thumbnail to a content video or video advertisement based upon determinations of user interest.

Caching component 130 can cache video ads, content videos, associated thumbnails, or overlays in memory 150 as a function of respective ordering of thereof. Caching component 130 can store cached media files/content (e.g. video ads, content videos, associated thumbnails, overlays, or other digital media) so that future requests for respective media files can be served quickly. The cached media files can be duplicates of corresponding sections of original media files which may be stored elsewhere. If the cached media files are requested, the request can be served by simply reading the cache, which is comparatively faster than reading the original media files. Hence, the greater the number of requests that can be served from the cached section, the faster overall performance of advertising delivery system 100 becomes. The cached media can be aged out of or persisted in memory 150 as a function of ranking, staleness, relevance, etc. In an embodiment, multiple levels of cache can be employed; respective sections of media can be cached in respective caches as a function of ranking, ordering, demand, etc. For example, highest performance cache can be allocated to highest ranked and in most demand media files.

Figure 2:
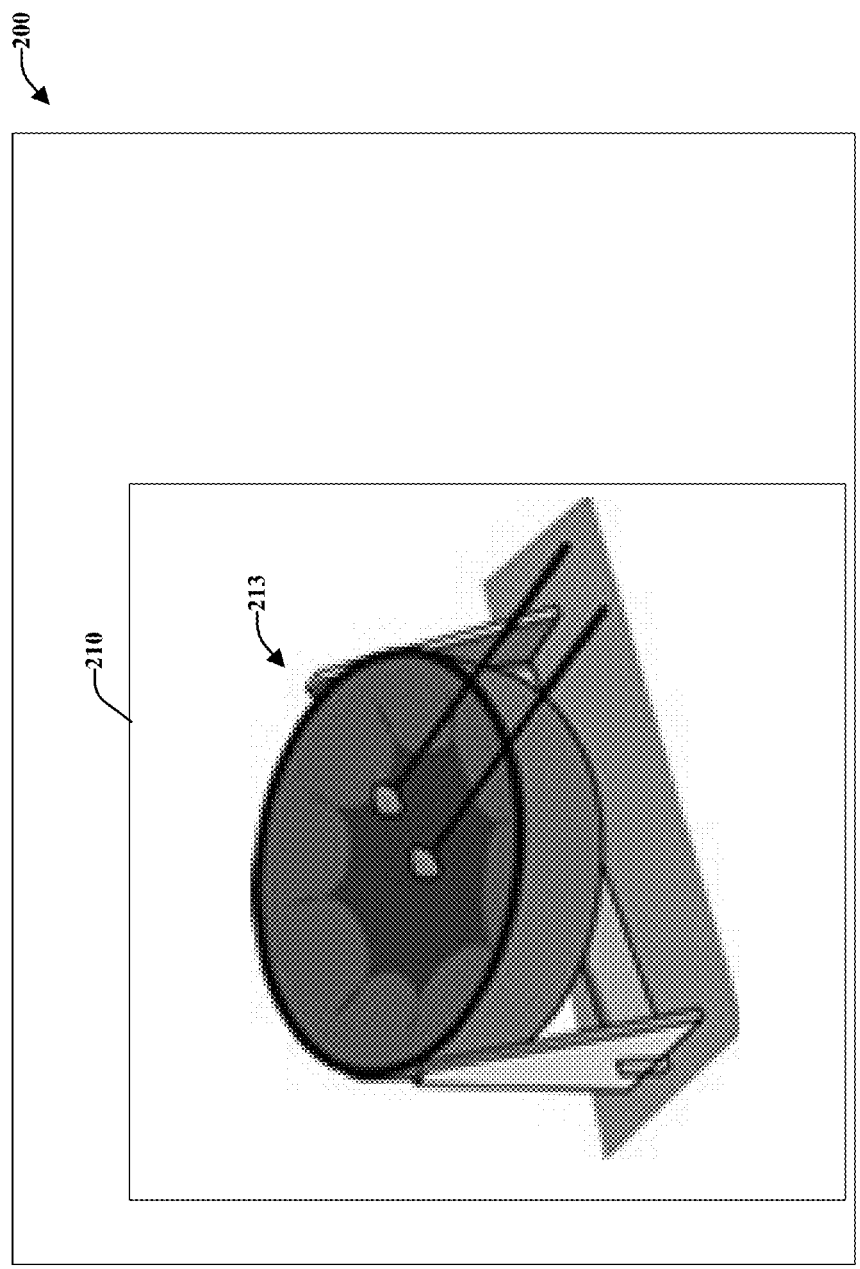
FIG. 2 illustrates an exemplary non-limiting display of a user interface for displaying a video advertisement or content video in accordance with an implementation of this disclosure.
Figure 3:
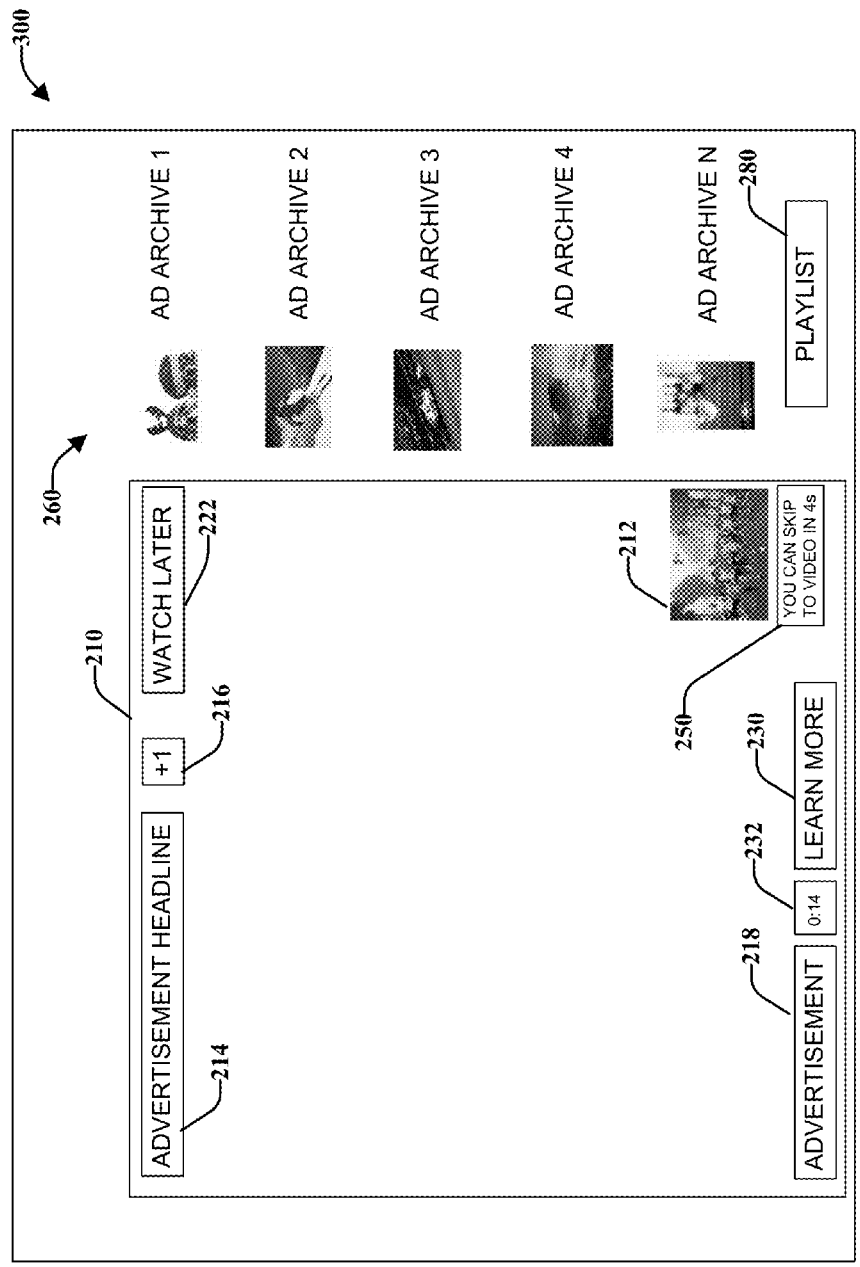
FIG. 3 illustrates a block diagram of an exemplary non-limiting overlay with video advertisement thumbnails and a watch later button in accordance with an implementation of this disclosure.
Figure 4:
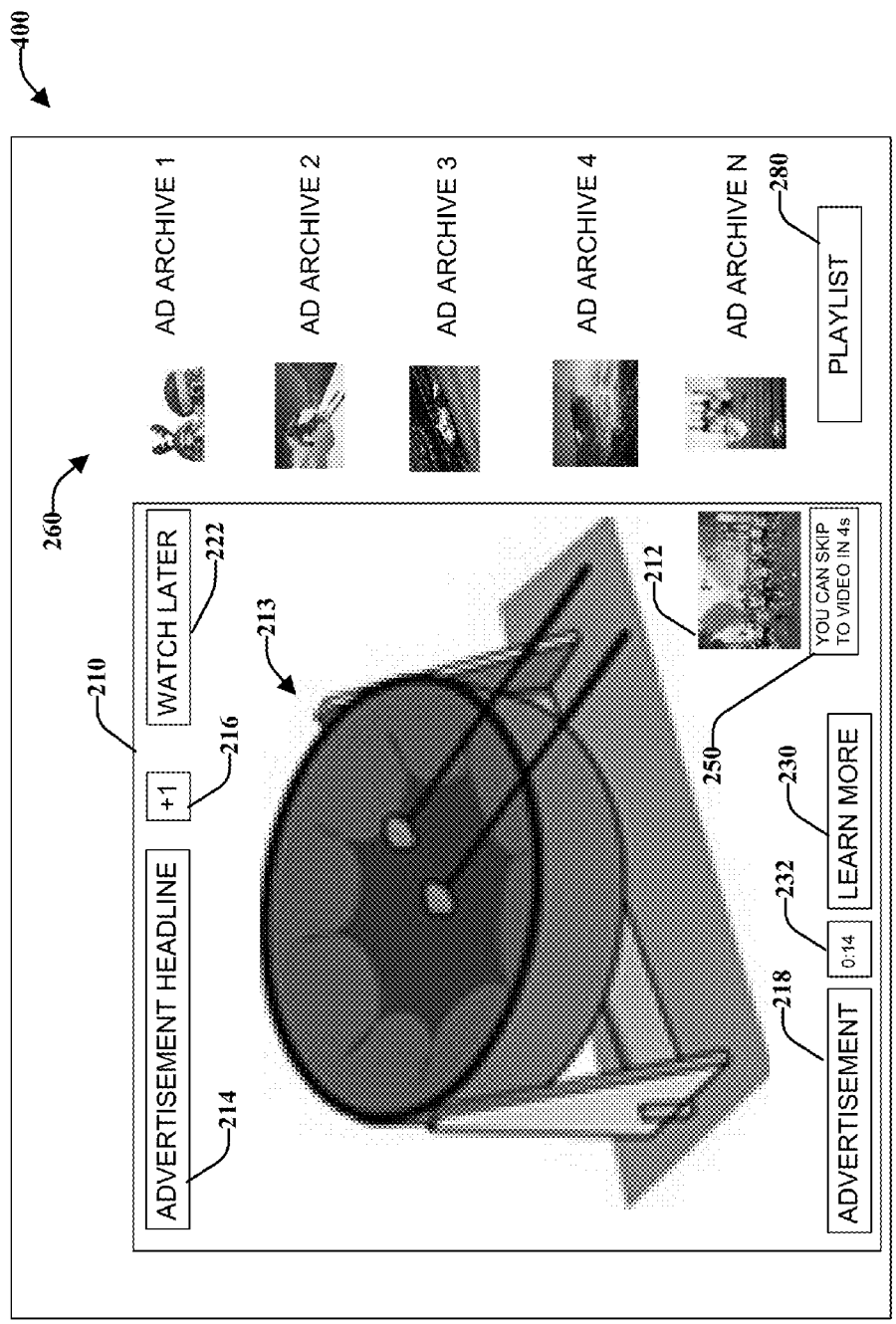
FIG. 4 illustrates an exemplary non-limiting display of a user interface for displaying a video advertisement with an overlay from FIG. 3 in accordance with an implementation of this disclosure.
Figure 5:
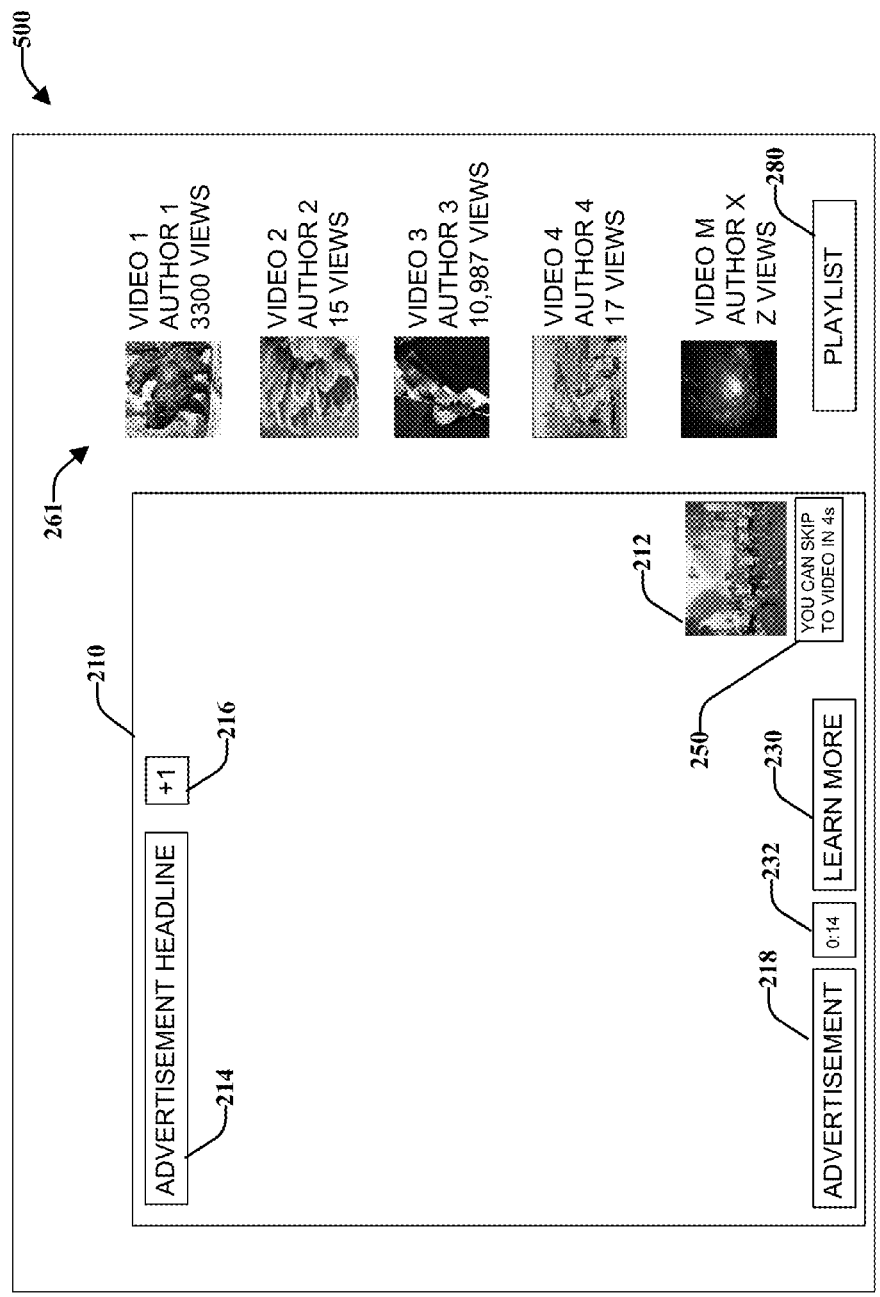
FIG. 5 illustrates a block diagram of an exemplary non-limiting overlay with content video thumbnails in accordance with an implementation of this disclosure.
Figure 6:
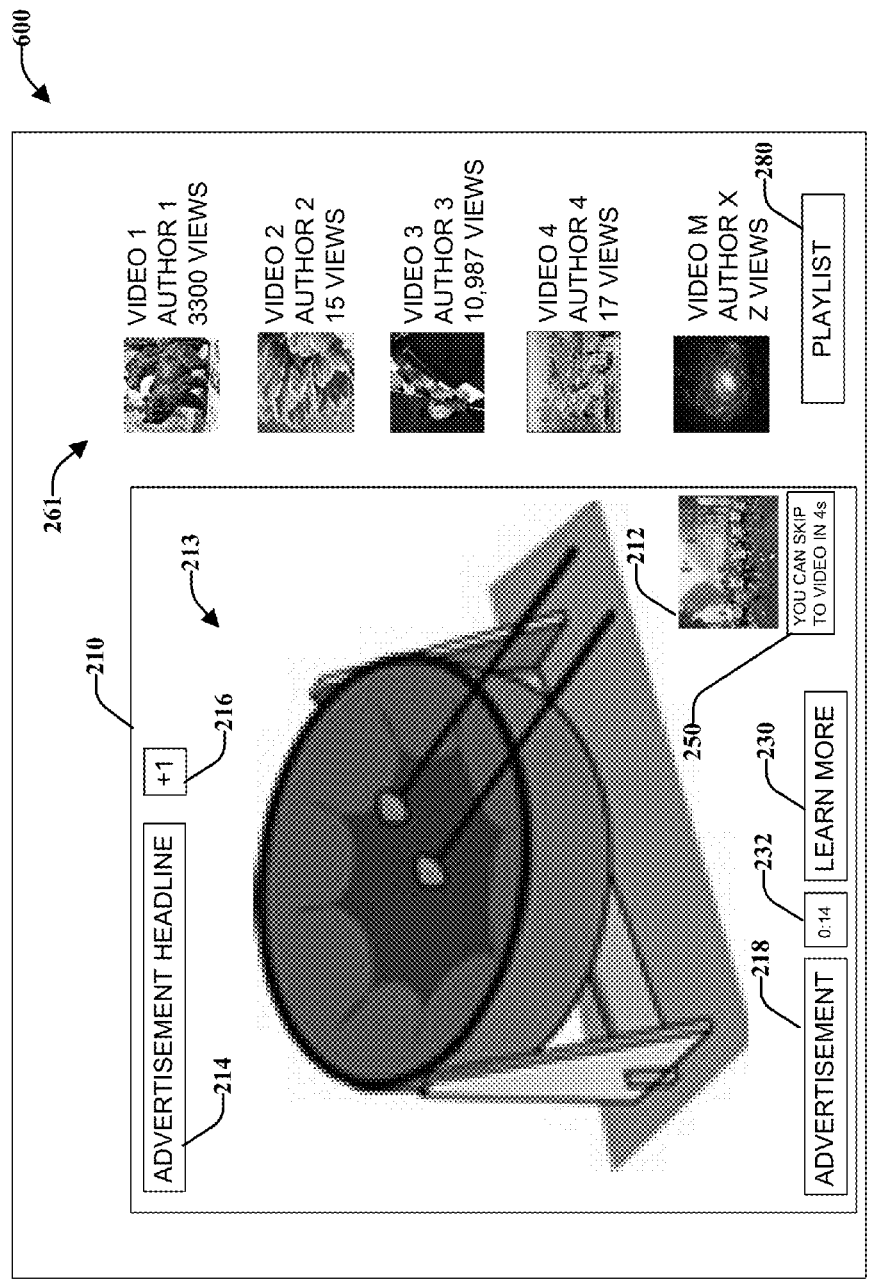
FIG. 6 illustrates an exemplary non-limiting display of a user interface for displaying a video advertisement with an overlay from FIG. 5 in accordance with an implementation of this disclosure.
Figure 7:
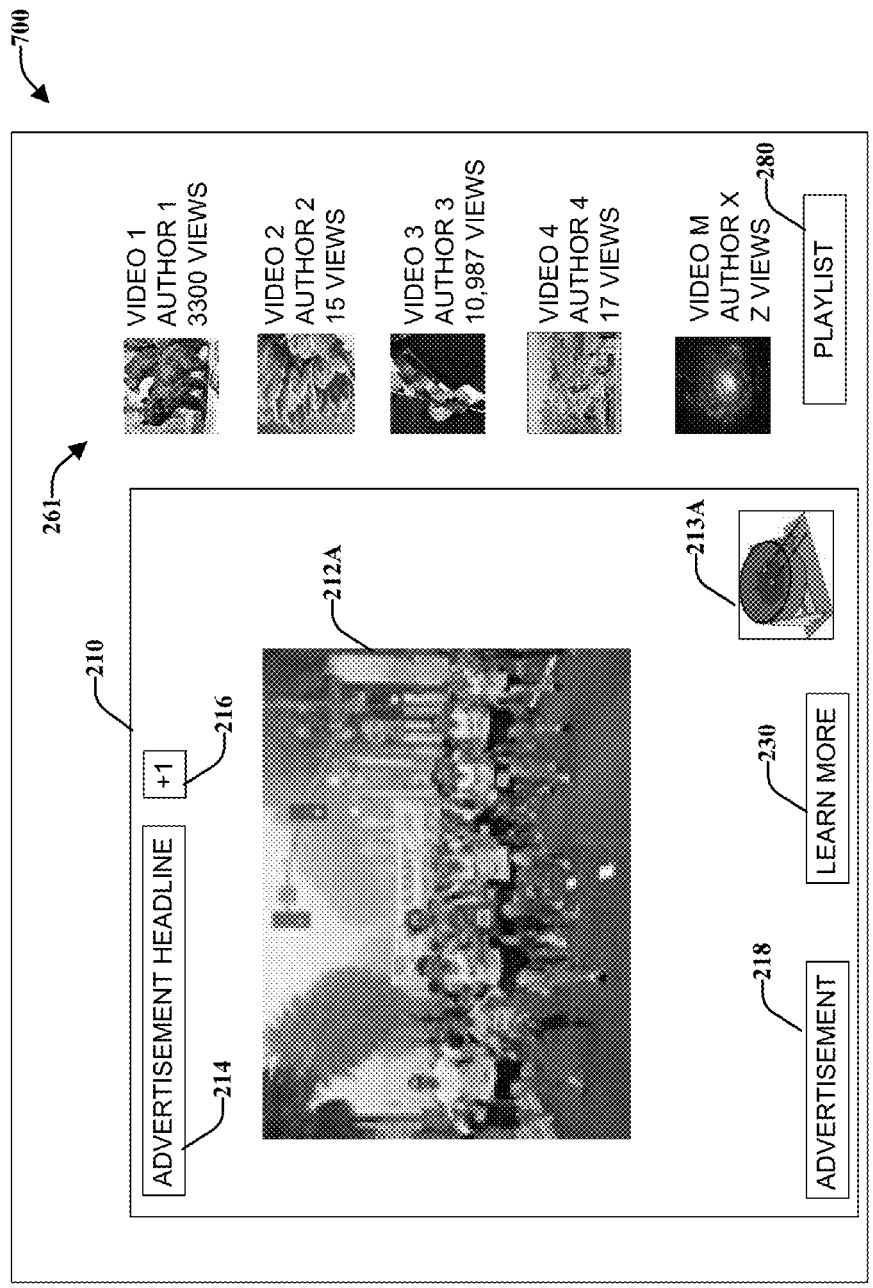
FIG. 7 illustrates an exemplary non-limiting display of a user interface for displaying a content video with an overlay related to a video advertisement in accordance with an implementation of this disclosure.

Referring to FIGS. 1-7, presentation component 140 can generate as shown in FIG. 2 a display 200 that displays a media player 210 that can play a video advertisement 213 or content video (not shown). FIGS. 3 and 5 illustrate respective overlays 300, 500 that can be generated by overlay component 103 and respective components described in this disclosure that generate or provide various features and functionalities. Overlays 300, 500 can be applied to the in-stream video advertisement 213 as shown in FIGS. 4 and 6 where respective overlays applied to in-stream video ads 400, 600 are depicted. Furthermore, portions of overlay 300, 500 can be applied to a content video 212A (e.g. associated with thumbnail 212) that is displayed/playing as shown in FIG. 7, for example after the user has completed watching video ad 213, skipped video ad 213, or chosen to watch later video ad 213, and begun playing content video 212A. Overlay component 103 in conjunction with the presentation component 140 can generate a highly functional environment for users to interact with and manage video advertisements. As noted, the one or more elements/features of overlays 300, 500 can be selectively masked or unmasked (e.g., by the user, or by a machine or system). In a non-limiting example, masking or unmasking one or more elements/features of overlays can also be performed automatically for example as a function of determined or inferred user intent, user context, video content, etc. In another non-limiting example, automatic masking or unmasking of one or more elements/features of the overlay can be performed periodically, at fixed, random, or dynamically selected intervals. For example, an overlay can be presented at the beginning of playing of a content video and be masked after a period of time, and then reappear after another period time, and repeat this process until the end of the video. In another example, an overlay can be presented at a certain point during playing of a content video and be masked after a period of time. In a further non-limiting example, an option (not shown) can be provided for a user to mask or unmask one or more elements/features of an overlay. It is to be further appreciated that displaying of overlays 300, 500 can be optional based upon a level of user engagement with the video advertisement, for example, such as upon amount of viewing time or monitoring of user activity. Furthermore, displaying of overlays 300, 500 can be optional based upon advertiser specified parameters or option, partner parameters or options, or user preferences.

Turning to the respective features and functionalities made available by overlay 300, 500, thumbnail component 110 can generate a thumbnail 212 of content video to be displayed after the video advertisement 213 in overlay 300, 500. To facilitate user comprehension of what video is being viewed, and what video is upcoming, presentation component 140 and the overlay component 103 can provide a variety of information and features/functionalities to enhance user viewing experience through displays and overlays. For example, overlays can be generated by overlay component 103 and displayed by presentation component 140. In a non-limiting example, overlay 300, 500 can include an advertisement headline 214. During playing of video ad 213, advertisement headline 214 can be shown for video ad 213 in the upper-left corner of the player, over a semi-transparent background. It is to be appreciated that the functional and text features described in this document are not limited to any particular location or context, and can be provisioned in any suitable manner or location. For example, advertisement headline 214 can automatically fade after G seconds (G is an integer) but reappear if the user hovers a cursor/pointer over anywhere on the video advertisement player 210. In another example, if video ad 213 does not have an advertisement headline 214, optionally a title of video ad 213 can be displayed instead. If video ad 213 is hosted on a website, the title can link to the video ad's watch page. Furthermore, hovering over the title can show mouseover text revealing a promotional slogan or the like related to video ad 213. Additionally, advertisement text 218 can be displayed, for example, at a bottom portion of the player. In a non-limiting example, advertisement text 218 can be static or dynamic text associated with video ad 213. In a further non-limiting example, advertisement text 218 can be customized to the user watching the video ad, for example, based on user preferences and/or interest.

Overlay 300, 500 can also provide a rating feature 216 (e.g., +1, −1, like, dislike rating feature . . . ) that allows the user to rate video ad 213. Additionally, in a non-limiting example, hovering over the +1 button can show a +1 annotation which indicates who else has or the number of other who have +1'd video ad 213. For example, indications can be provided of friends of the user who have +1'd video ad 213.

Overlay 300, 500 can provide a "watch later" button that operates in conjunction with the archiving component 101 to allow for storing, indexing, or bookmarking skipped ads so that they can be easily located and viewed by a user at a later point in time. In a non-limiting example, watch later button can be selected by a user archive video ad 213 so that it can be watched again at a later time. In another non-limiting example, watch later button 222 can be selected by a user to skip video ad 213, proceed to view a content video associated with thumbnail 212, archive video ad 213, and optionally add video ad 213 to a watch later playlist 280. It is to be appreciated that watch later button 222 can be presented instead of or in addition to a selectable skip button (not shown) for skippable in-stream ads. The watch later button 222 can optionally be configured to also display the skipped video ad 213 again at the end of the video content associated with thumbnail 212 as a post-roll.

Overlay 300, 500 can also provide a learn more button 230. Learn more button 230 can, for example, appear in yellow at the bottom middle area of the player, above video playback controls (not shown). It is to be appreciated that learn more button 230 can be displayed in any suitable manner or characteristics, non-limiting examples of which include color, shape, size, position, icon, or text. Learn more button 230 is clickable and can link the user to an advertiser's site associated with video ad 213, for example, where additional information regarding products or services associated with video ad 213 can be obtained or purchases can be made. In a non-limiting example, when the user clicks on the in-stream video ad 213, the video ad 213 can be paused, similar to the interactions for a content video.

Overlay 300, 500 can provide an advertisement counter 232 that displays playing time left in video advertisement 213. Advertisement counter 232 can, for example, be placed directly right of the "Advertisement" text in the bottom left of the player. Doing so, can mitigate confusion associated with a skip counter 250 that count downs for when the user can skip video ad 213, if video ad 213 is skippable. For example, in a non-limiting example, a user may be required to watch the entire video advertisement 213 before being able to watch a content video. In this case, a skip counter 250 may not be presented. In another non-limiting example, a user may only be required to watch a certain portion (skip threshold) of video ad 213 before being able to view the content video. As such, skip counter 250 can reflect the time remaining before the user can leave video ad 213 and watch the content video. It is to be appreciated that a selectable skip button (not shown) can be displayed after the skip counter has reached a skip threshold that allows for skipping video ad 213. In another non-limiting example, thumbnail 212 can be enabled to be selected for skipping video advertisement 213 after the skip counter has reached the skip threshold that allows for skipping video ad 213. It is to be appreciated that the skip threshold can be based on a predetermined fixed length of playback time of a video ad, a percentage of playback time of the video ad, a dynamically adjusted length of playback time of a video ad, a length of playback time of a video ad based upon a length of content video to be viewed after the video ad, or other criteria.

Overlay 300, 500 can also include (e.g., as a function of the ordering) archived video ads or the thumbnails 260 of archived video ads that can be viewed, or content videos or the thumbnails 261 of content videos that can be viewed. For example, the ordering of archived advertisements can be a function of current user context, user preferences, user historical actions, video content just watched. Overlay 300, 500 can fade in or fade out respective thumbnails 212, 260, 261, 213A as a function of the various metrics. In a non-limiting example, as the video advertisement 213 progresses, the thumbnail 212 can increase in detail, resolution, color, opaqueness, and/or size, thereby enticing the user to finish watching the video advertisement 213. Furthermore, additional information, such as text or graphics, about the upcoming video content to be displayed after the video advertisement 213 can be added and/or removed as part of the fading to further entice the user to watch the video advertisement. It is to further be appreciated that the additional information can be presented in a glanceable manner, so as not to overly distract the user from the video ad. In a non-limiting example, Overlay 300, 500 can fade in or out a thumbnail after a predetermined fading threshold, such as, a fixed length of playback time of a video ad, a percentage of playback time of the video ad, a dynamically adjusted length of playback time of a video ad, a length of playback time of a video ad based upon a length of content video to be viewed after the video ad, or other criteria. Furthermore, the rate of fading can be fixed or dynamically adjusted, for example, as a function of the amount of playback time left for the video ad. Moreover, with respect to the thumbnails 260, 261, certain thumbnails can be modified (e.g., resized, faded in, faded out, higher resolution, highlighted, etc.) to emphasize a subset of the thumbnails 260, 261 and the corresponding archived video ads or video content.

Overlay 300, 500 can also include options for user sharing of video advertisements to other users. Furthermore, overlay 300, 500 can include interactions defined by an advertiser.

Although various thumbnails 260, 261 and playlist(s) 280 are shown on the same page, it is to be appreciated that they can be on a separate page. The playlist feature 280 when clicked can display a set of archived video ads 260 or content videos 261 that will initiate running in a serial manner, and the ordering component 120 can tailor ordering of the respective playlists as a function of the various metrics described in this disclosure. Additionally, in a non-limiting example, a playlist 280 can include video advertisements, thumbnails of video advertisements, content videos, and/or thumbnails of content videos.

Additionally, the presentation component 140 and/or overlay component 103 can present content viewing options for use with any suitable type of client device that receives media files. Client devices often have different capabilities and limitations (e.g., screen size, processors, decoders . . . ). In an aspect, the presentation component 140 and/or overlay component 103 can provide presentation options in accordance with different client device capabilities or limitations. For example, data rendering capabilities may be more limited in a mobile device (e.g., a smart-phone) than in a fixed computing device (e.g., a desktop computer), such as a larger percentage of client device processing resources may be required to present a media file, such as a video (or other information), on the mobile device than would be required in viewing the same media file on a fixed computing device. In addition, because displays of various mobile devices are often smaller and/or lower resolution than displays in fixed computing devices, it may be possible only to display a relatively small amount of information at any given time on a mobile device. Presentation component 140 and/or overlay component 103 can thus optimize display of options and content for respective devices. Furthermore, data connections between a mobile device and various networked resources (e.g., the Internet) may be slower than corresponding data connections between a fixed computing device and the same networked resources. Accordingly, presentation component 140 and/or overlay component 103 can generate user options to account for variations in device capabilities and available bandwidth for consumption and rendering of media content. For example, differing format or resolution versions of the same media file can be presented based upon client device capabilities and limitations. In a non-limiting example, a video ad, thumbnail or content video can be presented in a highly compressed encoding format and with lower resolution to a mobile device over a wireless network, while a lower compressed encoding format and higher resolution version of the same video ad, thumbnail or content video can be presented to a desktop computer on a wired network.

In view of the above, in an aspect, the presentation component 140 and/or overlay component 103 can present media content in various formats and/or in accordance with various display mediums. For example, in one embodiment, the presentation component can present a section of video in a format such as H.263, H.264 AVC, MPEG-4 SP, VP8, or other suitable format. In another embodiment the presentation component 410 may present an audio section in formats such as for example AAC LC/LTP, HE-AACv1(AAC+), HE-AACv2 (enhanced AAC+), AMR-NB, AMR-WB, FLAC, MP3, MIDI, Vorbis, PCM/WAVE, etc.

In an aspect, presentation component 140 and/or overlay component 103 can automatically configure or present user options to consume media content based on encoding parameters such as video resolution, video frame rate, video bit rate, video codec, audio codec, audio channels, audio bit rate, etc. Thus, presentation component 140 and/or overlay component 103 or a user may choose a format to consume media content that best suits capabilities of specific consumption mediums, available bandwidth, file size, processing capabilities, screen resolution, screen size, available encoders, available decoders, etc.

FIGS. 3 and 4 illustrate an overlay 300 with video advertisement thumbnails 260, where the overlay 300 also includes a watch later button 222. FIGS. 5 and 6 illustrate an overlay 500 similar to overlay 300, but with content video thumbnails 261 and excluding watch later button 222. FIG. 7 illustrates a display playing content video 212A (associated with thumbnail 212), for example after the user has completed watching video ad 213, skipped video ad 213, or chosen to watch later video ad 213, and begun playing content video 212A. Moreover, an overlay is displayed with content video 212A that includes elements from overlay 300,500, such as, advertisement headline 214, rating feature 216, advertisement text 218, learn more button 230. Additionally the overlay of FIG. 7 includes a thumbnail 213A corresponding to video ad 213. It is to be appreciated that any combination of overlay elements can be included or excluded in an overlay as appropriate, as well, as being automatically added, removed, faded, highlighted, etc. at various times in the overlay.

In an implementation, billing component 174 can postpone billing of an advertisement that was skipped for example until a threshold of viewing time of a video advertisement was reached. If a user later watched the video as a post-roll or as part of the "watch later" playlist, then this action could optionally be tracked by the billing component 174. If the user met the viewing threshold for the amount of time needed to qualify for a view, then the view can be treated as a billable event regardless of whether the advertisement was watched when first presented or afterwards. Thus, the billing component 174 in connection with the archiving component 101 and the thumbnail views of archived video ads 260 can facilitate increasing advertisement related revenue for both advertisers (e.g., mitigating opportunity loss associated with skipped ads by providing users with an ability to view skipped ads at a later point in time thus creating renewed sales opportunity and brand recognition for the advertisers), and host sites for the video advertisements by increasing opportunity for users to reach the viewing threshold time required to charge for an advertisement view. It is to be appreciated that the viewing threshold can be based on a fixed length of playback time of a video ad, a percentage of playback time of the video ad, a dynamically adjusted length of playback time of a video ad, a length of playback time of a video ad based upon a length of content video to be viewed associated with the video ad, or other criteria.

Figure 8:
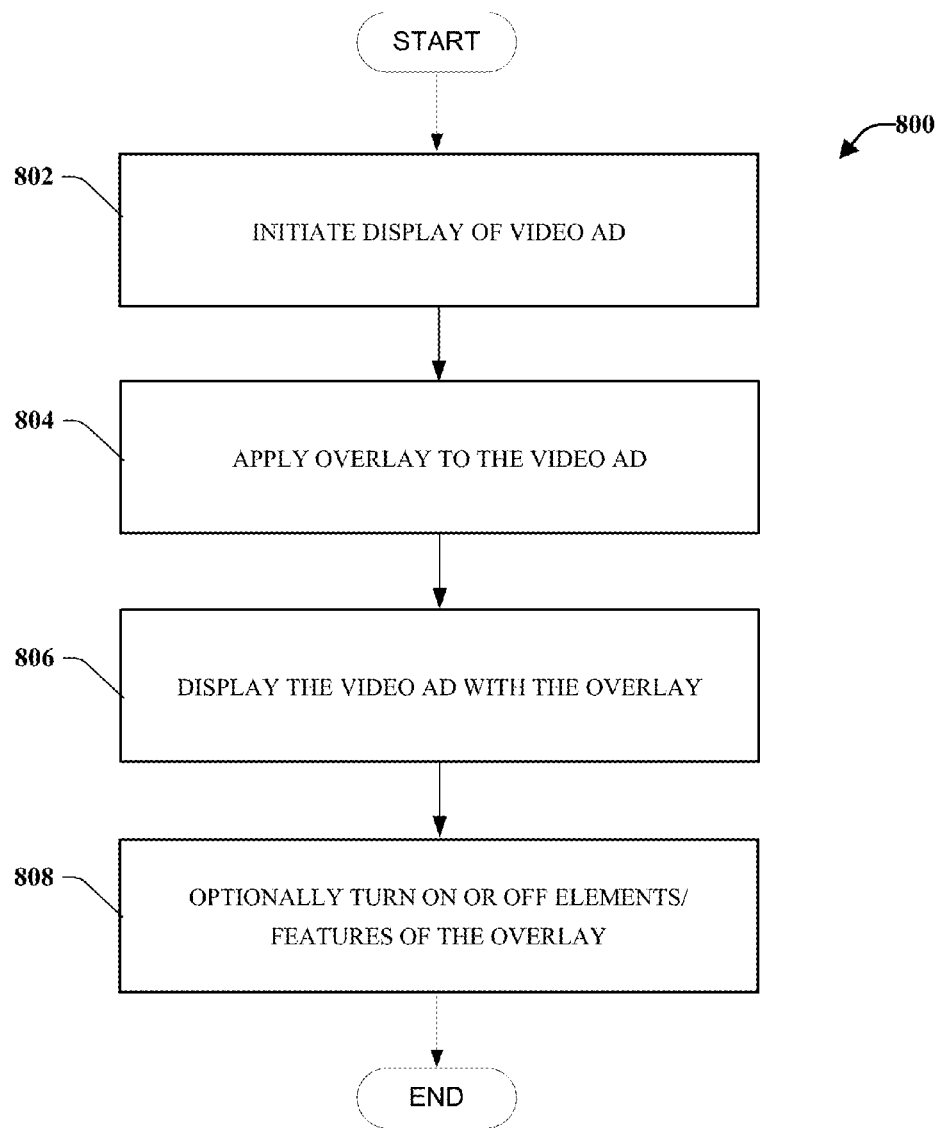
FIG. 8 illustrates an exemplary non-limiting flow diagram for presenting an overlay with conjunction with a video advertisement in accordance with an implementation of this disclosure.
Figure 9:
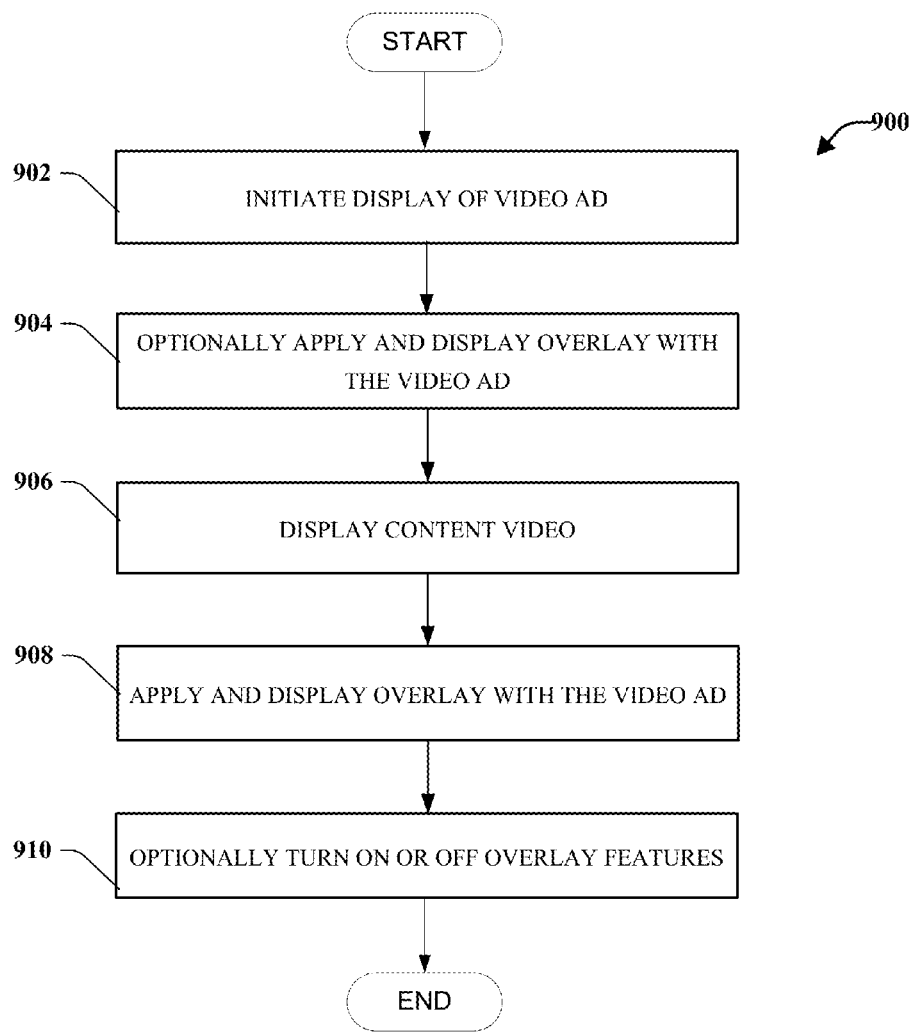
FIG. 9 illustrates an exemplary non-limiting flow diagram for presenting an overlay in conjunction with a video advertisement and content video in accordance with an implementation of this disclosure.

FIGS. 8 and 9 illustrate various methodologies in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, an exemplary methodology 800 for presenting an overlay in conjunction with a video ad is illustrated. At 802, display of a video ad is initiated (e.g., using presentation component 140). At 804, an overlay related to the video ad is generated and/or applied to the video ad (e.g., using presentation component 140 and/or overlay component 103). At 806, the video ad is displayed with the related overlay (e.g., using presentation component 140 and/or overlay component 103). At 808, overlay elements/features can optionally be masked or unmasked automatically and/or by manual user input (e.g., using presentation component 140 and/or overlay component 103).

Referring now to FIG. 9, an exemplary methodology 900 for presenting a video advertisement overlay in conjunction with a content video is illustrated. At 902, display of a video ad is initiated (e.g., using presentation component 140). At 904, optionally an overlay related to the video ad is generated and/or applied to the video ad (e.g., using presentation component 140 and/or overlay component 103). At 906, displaying of the video advertisement is ended and a content video is displayed. (e.g., using presentation component 140 and/or overlay component 103). It is to be appreciated that displaying of the content video can be the result of, for example, playing of the video ad reached the end, a user choosing to skip the video ad, or a user choosing to watch the video ad later. At 908, an overlay related to the video ad is generated and/or applied to the video ad (e.g., using presentation component 140 and/or overlay component 103). It is to be appreciated that the overlay at 908 can be the same or different from the overlay at 904. At 910, overlay elements/features can optionally be masked or unmasked automatically and/or by manual user input (e.g., using presentation component 140 and/or overlay component 103).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
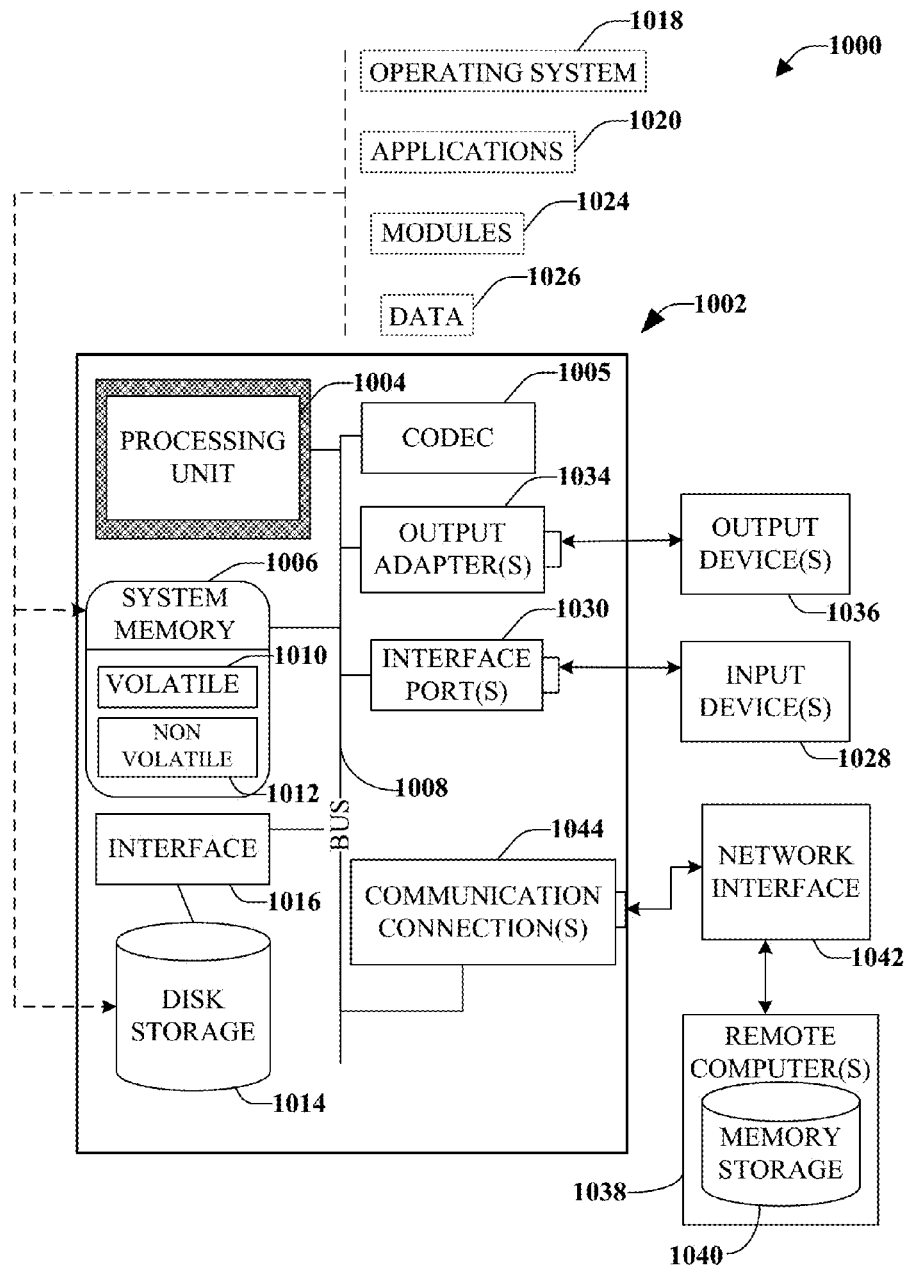
FIG. 10 illustrates a block diagram representing an exemplary non-limiting operating environment in which the various embodiments can be implemented.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. In an embodiment, the computer 1002 can for example be used to implement one or more of the systems or components shown or described in connection with FIGS. 1-7. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
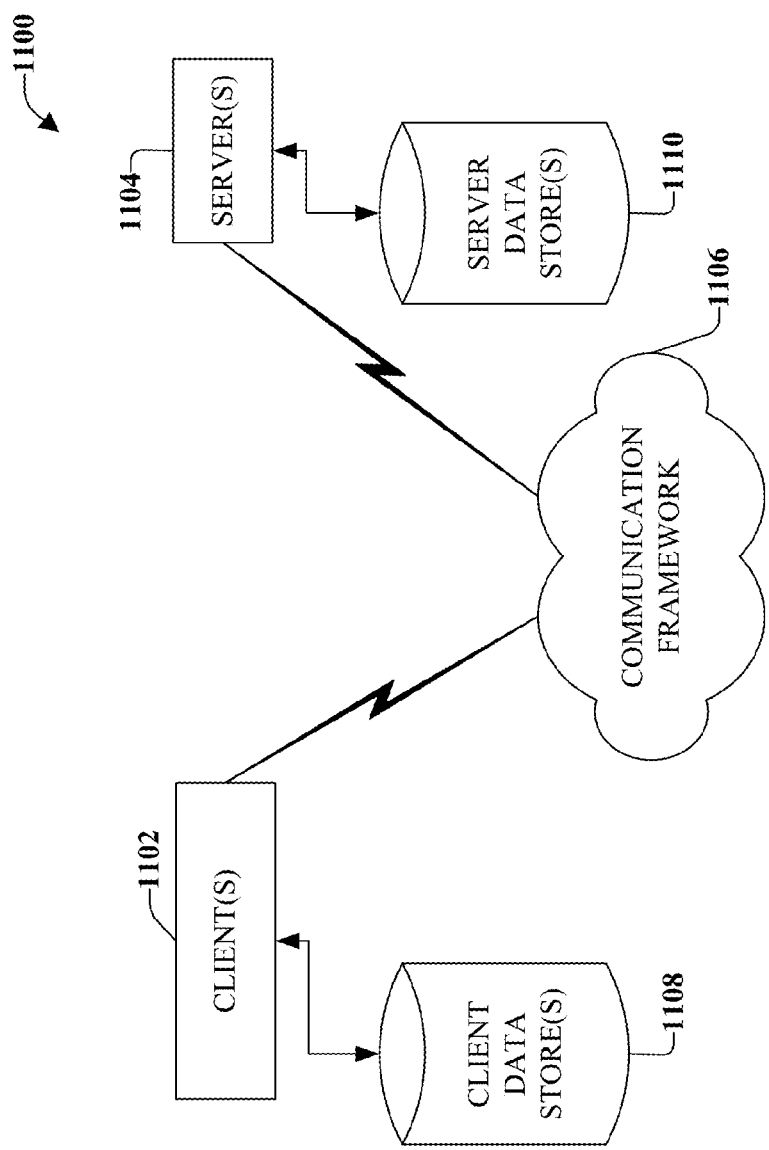
FIG. 11 illustrates a block diagram representing an exemplary non-limiting networked computing environment in which the various embodiments can be implemented.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
   a memory having stored thereon computer executable components; and
   a processor configured to execute the following computer executable components stored in the memory:
   a presentation component that is to present to a user a first video that is an advertisement, wherein first video is associated with a second video that is not an advertisement; and
   an overlay component that is to generate a skip overlay for the first video, the skip overlay containing a thumbnail of the second video, wherein the skip overlay, when displayed over the first video, contains the thumbnail to provide a memory aid to the user about the second video that is associated with the first video, and wherein the skip overlay further displays a countdown indicating to the user when an option to skip the first video, by selecting the skip overlay, will become available and skipping of the first video is inhibited until the option becomes available.

2. The system of claim 1, wherein the skip overlay further contains the word "skip".

3. The system of claim 2, wherein the word "skip" is to be displayed within a selectable option in the skip overlay, and wherein the overlay component is further to cause the first video to end and resume or commence playing the second video in response to receiving a user selection of the selectable option.

4. The system of claim 3, wherein the thumbnail is displayed after a predetermined portion of the first video has been played.

5. The system of claim 1, wherein the processor is further configured to execute:
   an archive component, wherein the archive component is to archive the first video for later viewing in response to receiving a user selection to skip the first video.

6. The system of claim 1, wherein the processor is further configured to execute:
   a billing component to delay billing for the first video until a threshold of viewing time of the first video has been reached.

7. The system of claim 1, wherein the presentation component is further to display a thumbnail of an archived video advertisement.

8. The system of claim 7, wherein the presentation component is to apply a visual effect to the displayed thumbnail of the archived video advertisement.

9. The system of claim 8, wherein the visual effect is to be adjusted as a function of a length of playback time of the first video.

10. The system of claim 9, wherein the visual effect is selected from a group consisting of detail, resolution, color, opaqueness, size, and combinations thereof.

11. The system of claim 10, wherein the function comprises a ratio between a current playback position and the length of playback time.

12. The system of claim 1, wherein the overlay component is to display the skip overlay over at least a portion of the first video.

13. A method comprising:
   causing, by a processor, a first video to be displayed for viewing by a user, wherein the first video is an advertisement, and wherein the first video is associated with a second video that is not an advertisement; and
   causing, by the processor, a skip overlay to be displayed for the first video, the skip overlay containing a thumbnail of the second video to provide a memory aid to the user about the second video that is associated with the first video, wherein the skip overlay further displays a countdown indicating to the user when an option to skip the first video by selecting the skip overlay, will become available and skipping of the first video is inhibited until the option becomes available.

14. The method of claim 13, wherein the skip overlay further contains the word "skip".

15. The method of claim 14, wherein the word "skip" is displayed within a selectable option in the skip overlay, the method further comprising:
   causing, by the processor, the first video to end and resuming or commencing playback of the second video in response to receiving a user selection of the selectable option.

16. The method of claim 15, wherein the thumbnail is displayed after a predetermined portion of the first video has been played.

17. The method of claim 13, further comprising:
   archiving, by the processor, the first video for later viewing in response to receiving a user selection to skip the first video.

18. The method of claim 13, further comprising:
causing, by the processor, billing to be delayed for the first video until a threshold of viewing time of the first video has been reached.

19. The method of claim 13, further comprising:
causing, by the processor, a thumbnail of an archived video advertisement to be displayed.

20. The method of claim 19, further comprising:
causing, by the processor, a visual effect to be applied to the displayed thumbnail of the archived video advertisement.

21. The method of claim 20, further comprising:
causing, by the processor, the visual effect to be adjusted as a function of a length of playback time of the first video.

22. The method of claim 21, wherein the visual effect is selected from a group consisting of detail, resolution, color, opaqueness, size, and combinations thereof.

23. The method of claim 22, wherein the function comprises a ratio between a current playback position and the length of playback time.

24. The method of claim 13, wherein the skip overlay is displayed over at least a portion of the first video.

25. A non-transitory computer-readable medium having instructions encoded thereon which, when executed by a processor, instruct the processor to:
cause a first video to be displayed for viewing by a user, wherein the first video is an advertisement, and wherein the first video is associated with a second video that is not an advertisement, and
cause a skip overlay to be displayed for the first video, wherein the skip overlay is to contain a thumbnail of the second video to provide a memory aid to the user about the second video that is associated with the first video, wherein the skip overlay further displays a countdown indicating to the user when an option to skip the first video, by selecting the skip overlay, will become available and skipping of the first video is inhibited until the option becomes available.

26. The non-transitory computer-readable medium of claim 25, wherein the skip overlay further contains the word "skip".

27. The non-transitory computer-readable medium of claim 26, wherein the word "skip" is to be displayed within a selectable option in the skip overlay, and wherein the instructions further instruct the processor to:
cause the first video to end and resume or commence playing the second video in response to receiving a user selection of the selectable option.

28. The non-transitory computer-readable medium of claim 26, wherein the thumbnail is displayed after a predetermined portion of the first video has been played.

29. The non-transitory computer-readable medium of claim 25, wherein the instructions further instruct the processor to:
archive the first video for later viewing in response to receiving a user selection to skip the first video.

30. The non-transitory computer-readable medium of claim 25, wherein the instructions further instruct the processor to:
cause billing to be delayed for the first video until a threshold of viewing time of the first video has been reached.

31. The non-transitory computer-readable medium of claim 25, wherein the instructions further instruct the processor to:
cause a thumbnail of an archived video advertisement to be displayed.

32. The non-transitory computer-readable medium of claim 31, wherein the instructions further instruct the processor to:
cause a visual effect to be applied to the displayed thumbnail of the archived video advertisement.

33. The non-transitory computer-readable medium of claim 32, wherein the instructions further instruct the processor to:
cause the visual effect to be adjusted as a function of a length of playback time of the first video.

34. The non-transitory computer-readable medium of claim 33, wherein the visual effect is selected from a group consisting of detail, resolution, color, opaqueness, size, and combinations thereof.

35. The non-transitory computer-readable medium of claim 34, wherein the function comprises a ratio between a current playback position and the length of playback time.

36. The non-transitory computer-readable medium of claim 25, wherein the skip overlay is to be displayed over at least a portion of the first video.

37. A method comprising:
causing a client device to present a first video in response to a request from the client device to present a second video;
causing a thumbnail of the second video to be presented as an overlay on the first video after a predetermined portion of the first video has been played;
causing a skip user interface element to be presented as an overlay on the first video, wherein the skip user interface element includes a countdown indicating to a user of the client device when the skip user interface element will become selectable to skip the remainder of the first video;
inhibiting skipping of the first video until the skip user interface element becomes selectable;
receiving an indication that the skip user interface element has been selected at the client device; and
in response to receiving the indication that the skip user interface element has been selected, causing the client device to present the second video.

* * * * *